(No Model.)
A. D. ANDREWS.
MANDREL FOR PHONOGRAPHS.
No. 515,811. Patented Mar. 6, 1894.
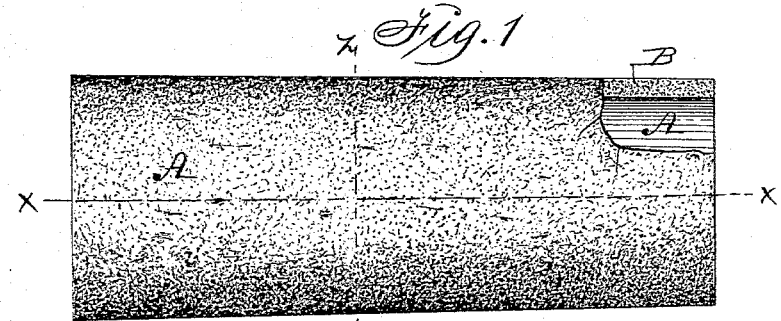
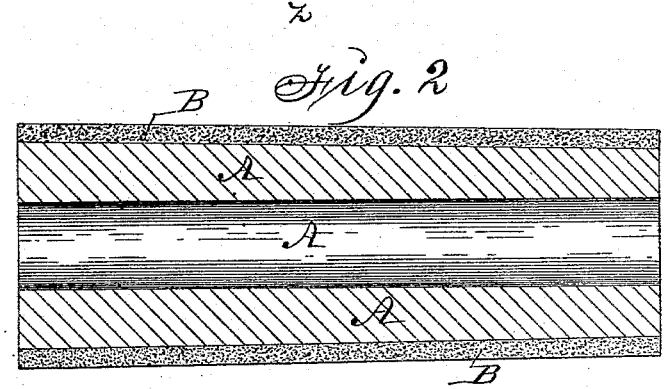
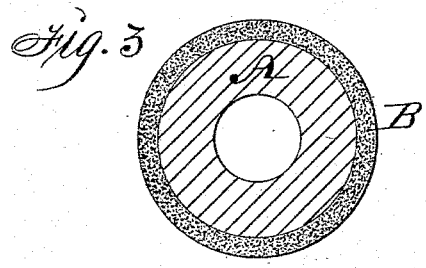
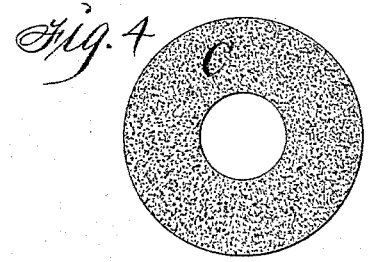
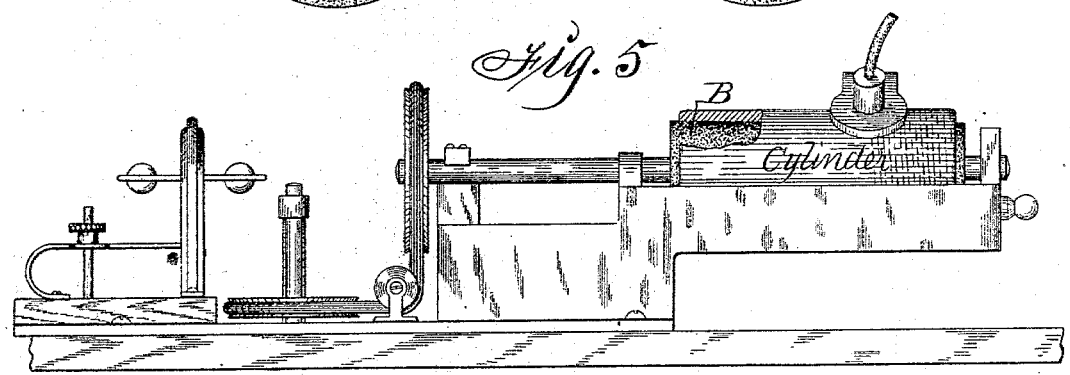
Witnesses:
W. J. Sankey.
R. H. Orwig.
Inventor: Arnelle D. Andrews,
By Thomas G. Orwig, Attorney.

UNITED STATES PATENT OFFICE.

ARNELLE D. ANDREWS, OF DES MOINES, IOWA.

MANDREL FOR PHONOGRAPHS.

SPECIFICATION forming part of Letters Patent No. 515,811, dated March 6, 1894.

Application filed January 2, 1892. Serial No. 416,804. (No model.)

*To all whom it may concern:*

Be it known that I, ARNELLE D. ANDREWS, a citizen of the United States of America, residing at Des Moines, in the county of Polk and State of Iowa, have invented an Improved Mandrel for Phonographs, of which the following is a specification.

My object is to avoid the difficulties and annoyances incident to the use of phonogram blanks upon metal mandrels. When the metal is warm and expanded the blanks made of wax and analogous substances adhere too closely to be easily removed and when the metal is cold the blanks are too loose to remain stationary on the mandrel while the machine is in operation.

My invention consists in providing a mandrel with an elastic surface that will not be affected by the temperature and upon which blanks can be readily and securely placed and also readily removed as required in the use and operation of interchangeable blanks.

My invention is illustrated in the accompanying drawings and pointed out in my claims.

Figure 1 is a surface view of a mandrel that has a solid core and a piece of non-metallic and elastic covering removed to disclose the solid interior. Fig. 2 is a sectional view through the line *x x* of Fig. 1. Fig. 3 is a transverse sectional view through the line *z z* of Fig. 1. Fig. 4 is a transverse section of a composite cylinder that has an elastic surface. Fig. 5 is a side view of a phonograph showing my improved mandrel in position as required in practical use to support a cylinder or phonogram blank.

A, shown in Figs. 1, 2, and 3, represents the solid core of a mandrel and B a nonmetallic and elastic tube fixed and fitted over the core. The core or central portion A of the mandrel may be made of wood, metal, or other suitable material, and vary in size as desired. The nonmetallic and elastic cover B is preferably made of rubber but it may be made of cork or other suitable material in the form of a tube that can be fitted and placed over the core A in such a manner that it will remain securely fastened thereto by its contractile force.

C shown in Fig. 4 represents a mandrel formed complete in one piece of cork, rubber, or other nonmetallic and elastic material. When made of rubber the interior can be vulcanized so as to make it rigid and solid while the exterior portion remains elastic. The diameter of one end of the mandrel is larger than the other end as required to produce a tapering body.

I am aware mandrels have been tapering and complete in one piece, but in no instance has a mandrel for phonographs been made complete in one piece with an outside smooth and elastic surface and in no instance has an elastic covering been combined with the solid core of a mandrel to adapt it for applying, retaining and removing advantageously a phonogram blank that is susceptible to the temperature of the metal surface of a mandrel.

In the practical use of my improved mandrel cylindrical blanks, adapted to be indented by a vibrating point and corresponding in size and shape with the mandrel, can be readily slipped on and off the non-metallic and elastic surface of the mandrel. The elasticity of the surface cover of the solid part of the mandrel allows the diameter of the mandrel to be slightly diminished by pressure as the tube or cover is being pressed on and when in proper position the expansive force of the compressed material will cause the cylinder to adhere securely as required to prevent it from moving relative to the mandrel while in operation. And the same elastic surface of the mandrel allows the cylinder blank to be readily moved longitudinally on the mandrel as required to remove it therefrom.

I claim as my invention—

1. A mandrel for phonographs made complete in one piece and its interior rigid and its outside surface elastic, substantially as and for the purposes stated.

2. A mandrel for phonographs that has an exterior elastic surface and its interior rigid, to operate in the manner set forth, for the purposes stated.

ARNELLE D. ANDREWS.

Witnesses:
J. RALPH ORWIG,
THOMAS G. ORWIG.